US010972223B2

United States Patent
Zhang et al.

(10) Patent No.: US 10,972,223 B2
(45) Date of Patent: Apr. 6, 2021

(54) TIMING CONSIDERATIONS FOR AUL-DFI

(71) Applicant: QUALCOMM Incorporated, San Diego, CA (US)

(72) Inventors: Xiaoxia Zhang, San Diego, CA (US); Qingjiang Tian, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 16/215,988

(22) Filed: Dec. 11, 2018

(65) Prior Publication Data

US 2019/0222356 A1 Jul. 18, 2019

Related U.S. Application Data

(60) Provisional application No. 62/616,867, filed on Jan. 12, 2018.

(51) Int. Cl.
  *H04L 1/16* (2006.01)
  *H04L 1/18* (2006.01)
  (Continued)

(52) U.S. Cl.
  CPC .......... *H04L 1/1607* (2013.01); *H04L 1/0003* (2013.01); *H04L 1/0009* (2013.01);
  (Continued)

(58) Field of Classification Search
  CPC ... H04L 1/1607; H04L 1/0073; H04L 1/0009; H04L 1/0003; H04L 1/1678; H04L 1/822;
  (Continued)

(56) References Cited

U.S. PATENT DOCUMENTS

2007/0168827 A1* 7/2007 Lohr ............... H04L 1/1845
                                                              714/749
2010/0281322 A1* 11/2010 Park ............... H04L 1/0001
                                                              714/748

(Continued)

OTHER PUBLICATIONS

3GPP RAN WG1 Chairman Satoshi Nagata: "Status Report for RAN WG1i to TSG-RAN #77", 3GPP Draft; RP-171517 RAN1 SR RAN #77, 3rd Generation Partnership Project (3GPP), Mobile Competence Centre, 650, Route Des Lucioles, F-06921 Sophia-Antipolis Cedex, France, vol. TSG RAN, No. Sapporo, Japan: Sep. 11, 2017-Sep. 14, 2017 Sep. 10, 2017, XP051324089, Retrieved from the Internet: URL:http://www.3gpp.org/ftp/Meetings_3GPP_SYNC/RAN/Docs/ [retrieved on Sep. 10, 2017].

(Continued)

*Primary Examiner* — Jung Liu

(74) *Attorney, Agent, or Firm* — Liem T. Do

(57) ABSTRACT

Timing considerations for autonomous uplink (AUL) downlink feedback information (AUL-DFI) is disclosed. With the flexible timeline for new radio (NR) operations, signaling of the processing timeline may be used for the served user equipments (UEs) to properly interpret the acknowledgement information in the AUL-DFI. The UE receives a signal identifying a minimum processing time of the serving base station to process AUL. Using the knowledge of the minimum processing time, the UE determines which of the outstanding AUL transmissions are accurately addressed in the AUL-DFI and which are still pending. Additional signaling to the UE may instruct the UE when to implement any (Continued)

changes to transmission parameters also signaled via the AUL-DFI. Slots prior to the indicated change time will be transmitted using the current parameters, while slots after the indicated time will use the updated parameters from the AUL-DFI.

30 Claims, 8 Drawing Sheets

(51) Int. Cl.
*H04L 1/00* (2006.01)
*H04W 72/04* (2009.01)
*H04W 72/08* (2009.01)

(52) U.S. Cl.
CPC .......... *H04L 1/0073* (2013.01); *H04L 1/1678* (2013.01); *H04L 1/188* (2013.01); *H04L 1/1822* (2013.01); *H04L 1/1864* (2013.01); *H04W 72/0446* (2013.01); *H04W 72/085* (2013.01); *H04L 1/1614* (2013.01)

(58) Field of Classification Search
CPC ..... H04L 1/1864; H04L 1/188; H04L 1/1614; H04L 5/14; H04L 1/1854; H04L 1/1812; H04L 5/0055; H04L 2001/0093; H04L 1/1822; H04B 7/2656; H04W 72/1289; H04W 72/085; H04W 72/0446
See application file for complete search history.

(56) References Cited

U.S. PATENT DOCUMENTS

| | | | |
|---|---|---|---|
| 2010/0322165 A1* | 12/2010 | Yoo | H04L 1/1812 370/329 |
| 2011/0026625 A1* | 2/2011 | Susitaival | H04W 52/0251 375/260 |
| 2013/0301490 A1* | 11/2013 | He | H04W 24/02 370/280 |
| 2014/0071868 A1* | 3/2014 | Bergquist | H04L 1/1803 370/311 |
| 2016/0344517 A1 | 11/2016 | Bergström et al. | |
| 2017/0279563 A1* | 9/2017 | Seo | H04L 5/1469 |
| 2017/0331611 A1* | 11/2017 | Stern-Berkowitz | H04L 1/1854 |

OTHER PUBLICATIONS

Intel Corporation: "HARQ Aspects on AUL". 3GPP Draft; R2-1712623, HARQ aspects on AUL, 3rd Generation Partnership Project (3GPP), Mobile Competence Centre, 650, Route Des Lucioles, F-06921 Sophia-Antipolis Cedex, France, vol. RAN WG2, No. Reno, USA; Nov. 27, 2017-Dec. 1, 2017 Nov. 17, 2017, XP051371318, Retrieved from the Internet: URL:http://www.3gpp.org/ftp/tsg%5Fran/WG2% 5FRL2/TSGR2%5F100/Docs/ [retrieved on Nov. 17, 2017], 5 pages.
International Search Report and Written Opinion—PCT/US2018/ 065141—ISA/EPO—dated Mar. 14, 2019.

\* cited by examiner

TIMING CONSIDERATIONS FOR AUL-DFI

CROSS-REFERENCE TO RELATED APPLICATIONS

This application claims the benefit of U.S. Provisional Patent Application No. 62/616,867, entitled, "TIMING CONSIDERATIONS FOR AUL-DFI," filed on Jan. 12, 2018, which is expressly incorporated by reference herein in its entirety.

BACKGROUND

Field

Aspects of the present disclosure relate generally to wireless communication systems, and more particularly, to timing considerations for autonomous uplink (AUL) downlink feedback information (AUL-DFI).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a UE, a first minimum processing time signal from a serving base station, wherein the first minimum processing time signal identifies a minimum processing time for the serving base station to process autonomous uplink (AUL) transmissions from the UE, receiving, at the UE, a downlink feedback information (DFI) message from the serving base station, wherein the DFI message includes acknowledgment information for a plurality of outstanding AUL transmissions from the UE, and identifying, by the UE, one or more acknowledged AUL transmissions of the plurality of outstanding AUL transmissions having a pending time in excess of the minimum processing time and one or more pending AUL transmissions of the plurality of outstanding AUL transmissions having the pending time within the minimum processing time.

In an additional aspect of the disclosure, an apparatus configured for wireless communication includes means for receiving, at a UE, a first minimum processing time signal from a serving base station, wherein the first minimum processing time signal identifies a minimum processing time for the serving base station to process AUL transmissions from the UE, means for receiving, at the UE, a DFI message from the serving base station, wherein the DFI message includes acknowledgment information for a plurality of outstanding AUL transmissions from the UE, and means for identifying, by the UE, one or more acknowledged AUL transmissions of the plurality of outstanding AUL transmissions having a pending time in excess of the minimum processing time and one or more pending AUL transmissions of the plurality of outstanding AUL transmissions having the pending time within the minimum processing time.

In an additional aspect of the disclosure, a non-transitory computer-readable medium having program code recorded thereon. The program code further includes code to receive, at a UE, a first minimum processing time signal from a serving base station, wherein the first minimum processing time signal identifies a minimum processing time for the serving base station to process AUL transmissions from the UE, code to receive, at the UE, a DFI message from the serving base station, wherein the DFI message includes acknowledgment information for a plurality of outstanding AUL transmissions from the UE, and code to identify, by the UE, one or more acknowledged AUL transmissions of the plurality of outstanding AUL transmissions having a pending time in excess of the minimum processing time and one or more pending AUL transmissions of the plurality of outstanding AUL transmissions having the pending time within the minimum processing time.

In an additional aspect of the disclosure, an apparatus configured for wireless communication is disclosed. The apparatus includes at least one processor, and a memory coupled to the processor. The processor is configured to receive, at a UE, a first minimum processing time signal from a serving base station, wherein the first minimum processing time signal identifies a minimum processing time for the serving base station to process AUL transmissions from the UE, to receive, at the UE, a DFI message from the serving base station, wherein the DFI message includes acknowledgment information for a plurality of outstanding AUL transmissions from the UE, and to identify, by the UE, one or more acknowledged AUL transmissions of the plurality of outstanding AUL transmissions having a pending time in excess of the minimum processing time and one or more pending AUL transmissions of the plurality of outstanding AUL transmissions having the pending time within the minimum processing time.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
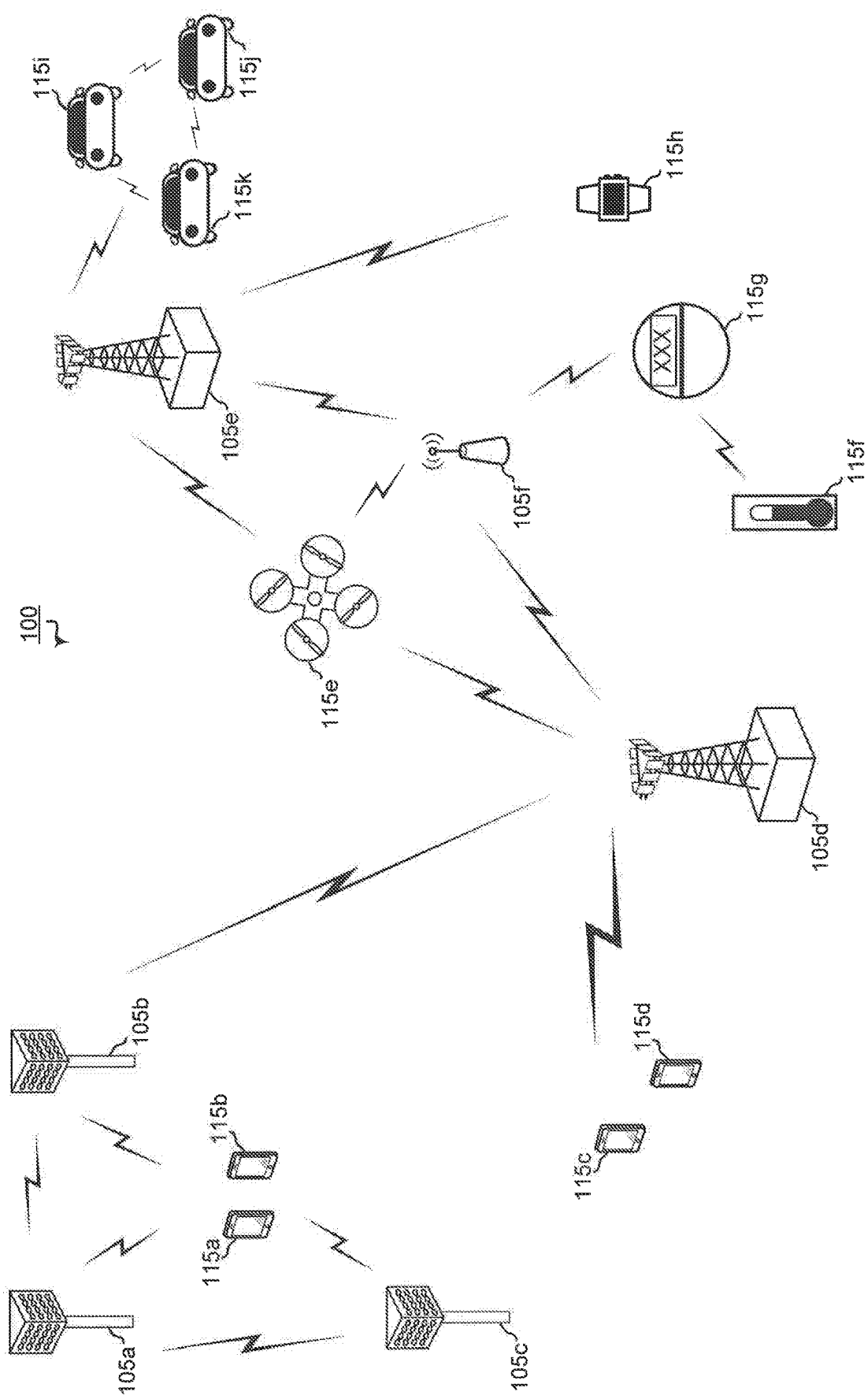
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
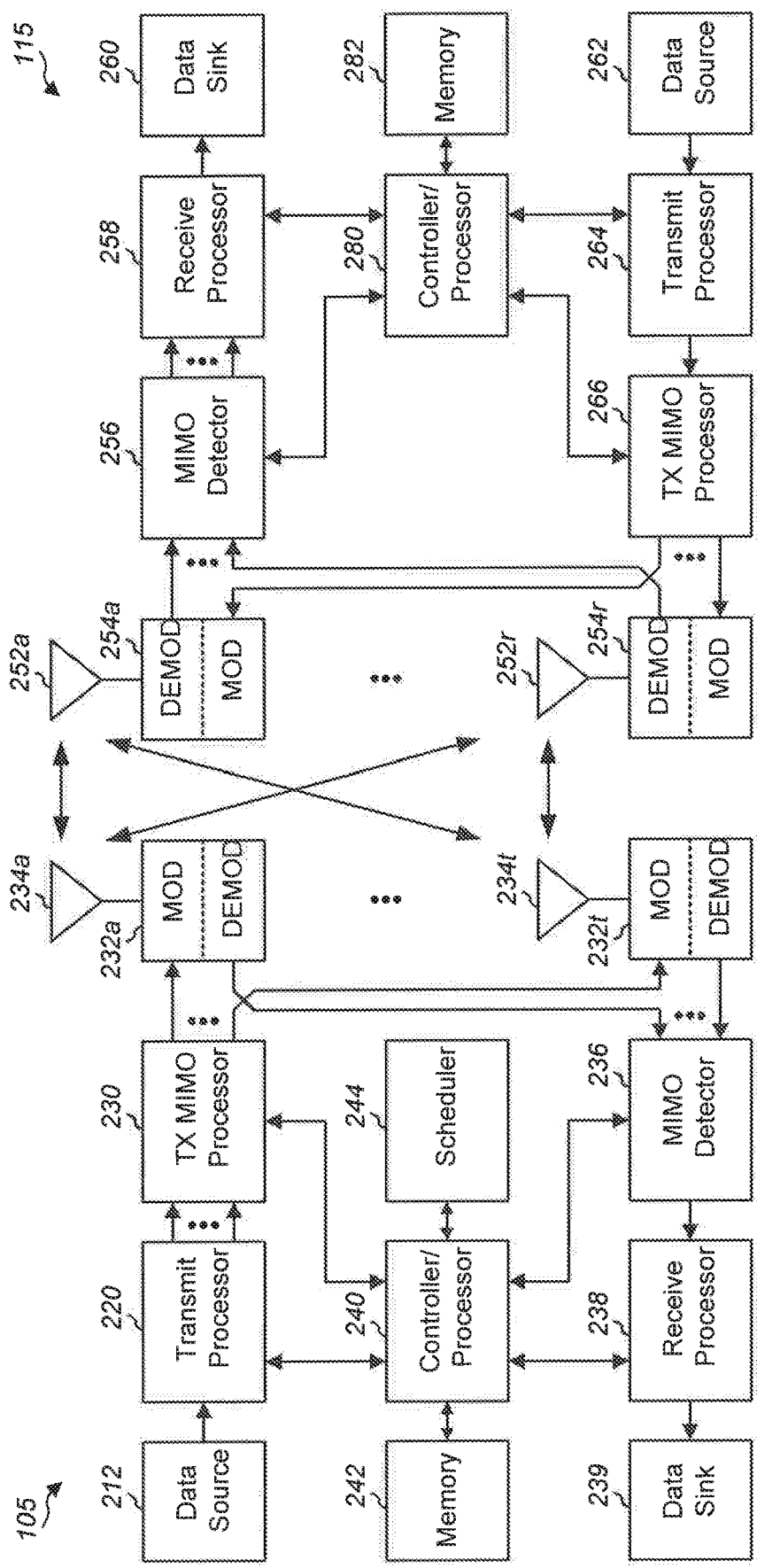
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
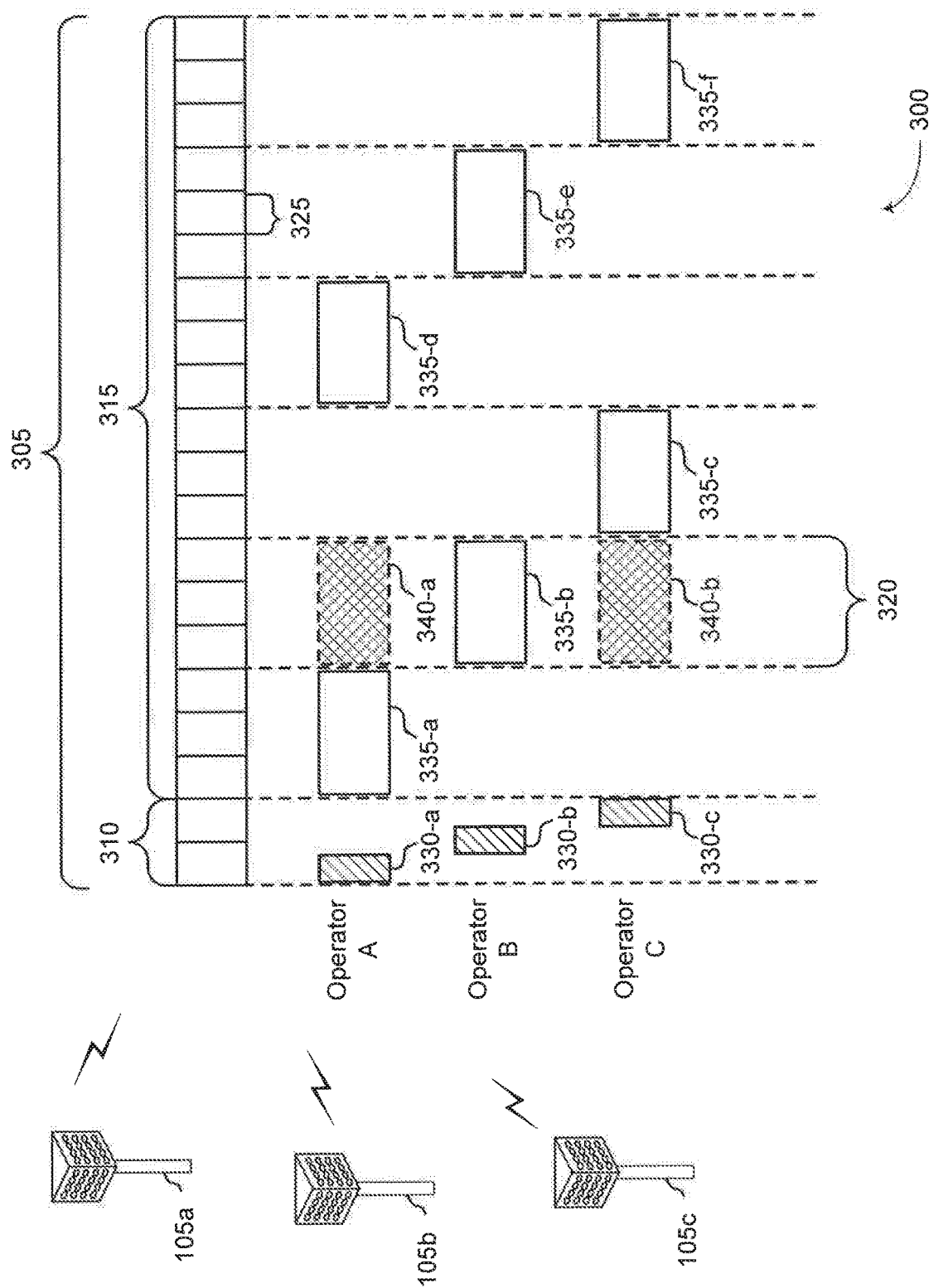
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Autonomous uplink (AUL) transmissions have been introduced in multiple radio access technologies, such as MulteFire (MF)/further enhanced license-assisted access (FeLAA)/new radio (NR). The goal of AUL is to improve channel utilization in the contention-based/unlicensed spectrum without relying on the base stations or gNB to have access to the shared medium to issue uplink grants. AUL can also reduce uplink transmission delay by obviating the transmission of scheduling requests (SR). The downlink feedback information (DFI) for AUL (AUL-DFI) has been suggested for FeLAA/MF operations to send feedback to the UE for its AUL transmissions.

In FeLAA/MF, the AUL-DFI is suggested to have a bitmap, in which each bit is directed to a hybrid automatic repeat request (HARQ) processes allocated to AUL, where the default acknowledgement value is predefined as a negative acknowledgement (NACK). Under current theories, the UE interprets the AUL-DFI bitmap based on a 4 ms processing timeline, as FeLAA/MF networks operate with a 4 ms processing timeline. That is, all of the HARQ processes outstanding for less than 4 ms will be deemed pending, regardless of their associated entry in the bitmap. Thus, even though the AUL-DFI bitmap may indicate NACK for such outstanding HARQ processes, the UE will interpret those as pending and to be populated in a next AUL-DFI bitmap. With a flexible processing timeline introduced in NR networks, there may be different HARQ processing timelines other than 4 ms or 4 slots. Various aspects of the present disclosure provide for informing a UE of the minimum base station AUL processing times in order to correctly interpret the AUL-DFI HARQ bitmap.

Figure 4:
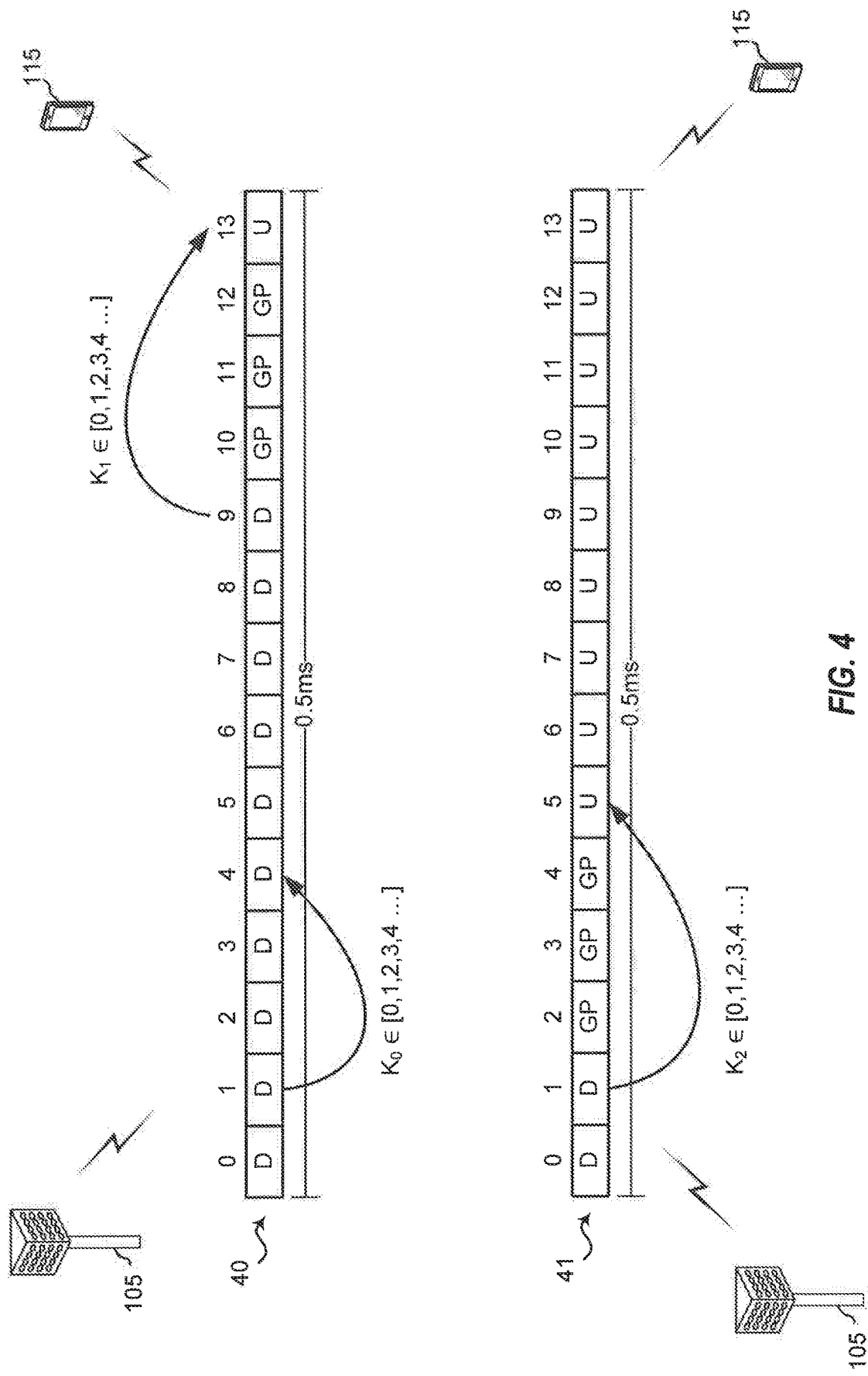
FIG. 4 is a block diagram illustrating communication streams between a base station and UE.

FIG. 4 is a block diagram illustrating communication streams 40 and 41 between base station 105 and UE 115. The HARQ operations in NR networks include different and variable timing relationships from LTE, MF, and FeLAA networks. For example, NR networks support the delay in slots between downlink grant, illustrated at symbol 1 of transmission stream 40, and corresponding downlink data (PDSCH) transmission, illustrated at symbol 4 of transmission stream 40 ($K_0$); the delay in slots between downlink data (PDSCH) reception, illustrated at symbol 9 of transmission stream 40, and corresponding acknowledgement transmission, illustrated at symbol 13 of transmission stream 40, on the uplink ($K_1$); the delay in slots between uplink grant reception in downlink, illustrated at symbol 1 of transmission stream 41, and uplink data (PUSCH) transmission, illustrated at symbol 5 of transmission stream 41, ($K_2$); and the delay in slots between acknowledgment (ACK/NACK) reception in uplink, illustrated at symbol 13 of transmission stream 40, and corresponding retransmission of data (PDSCH) on downlink ($K_3$) (not shown). While LTE/MF/FeLAA networks operate with $K_0$, $K_1$, $K_2$, and $K_3$ set to a minimum value of 4 ms/slots, NR networks implement a flexible processing time as low as 0 (e.g., $K_0$, $K_1$, $K_2$, and $K_3 \in [0, 1, 2, 3, 4, \ldots]$). $K_1$ and $K_2$ can be indicated to a UE dynamically using layer 1 (L1) downlink signaling. NR compatible UEs will support a minimum value of $K_0$ equal to 0, in which the downlink assignment and scheduled downlink data occur in same slot.

In NR networks, the base station is not currently configured to send ACK/NACK feedback for uplink transmission. The UE simply monitors the uplink grant after the transmission of PUSCH. By toggling the new data indicator within the grant, the base station will transmit either a new transmission grant or a retransmission grant after it finishes PUSCH processing. The timeline of the new transmission or retransmission grant is transparent to the UE. According to the aspects of the present disclosure, with the introduction of the AUL-DFI, the minimum AUL PUSCH processing timeline will to be indicated to the UE ($K1'$) so that that UE can properly interpret the AUL-DFI bitmap. Such timeline relationships could be added in the AUL radio resource control (RRC) configuration, in the activation/deactivation downlink control information (DCI), within the AUL-DFI transmission, or the like. This signaling allows the base station to update its processing timeline based on the AUL transport block size (TBS). Alternatively, the minimum processing time from PUSCH to DFI on a base station receiver can be broadcast in the cell if it is cell specific.

Figure 5:
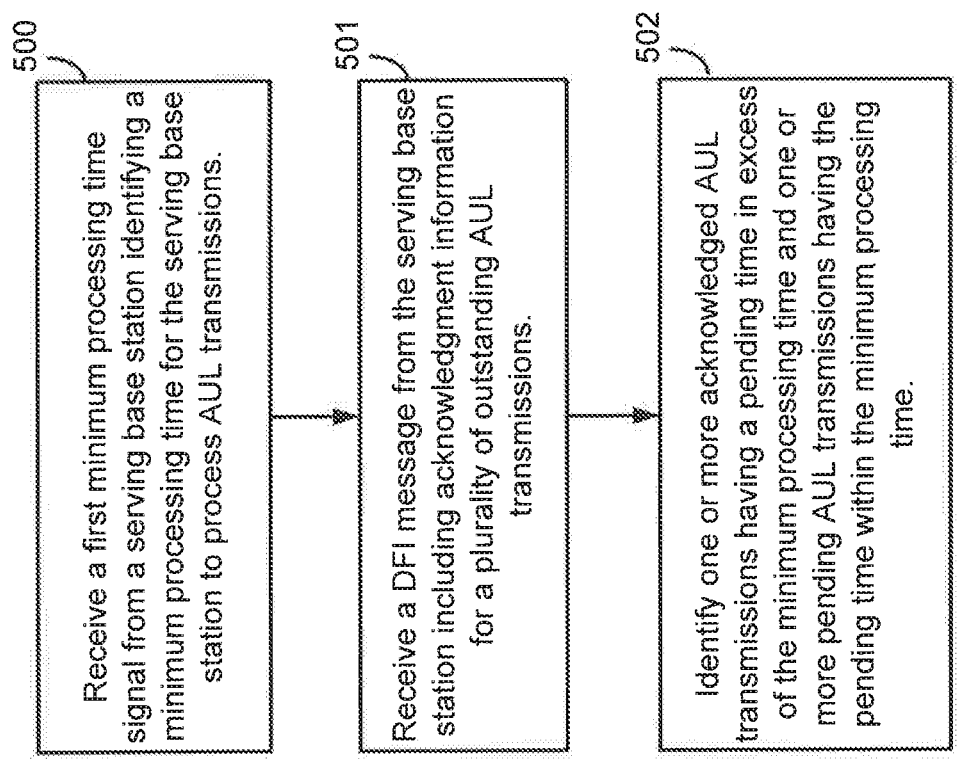
FIG. 5 is a block diagram illustrating example blocks executed to implement one aspect of the present disclosure.
Figure 8:
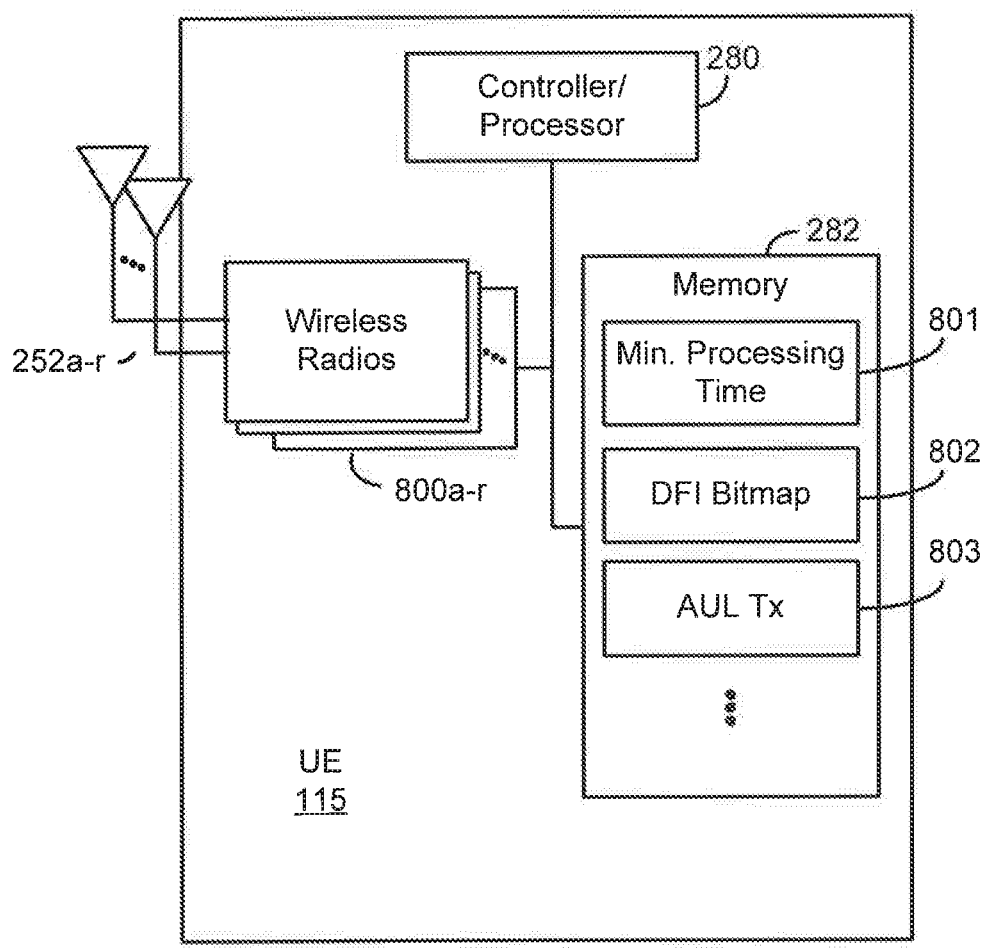
FIG. 8 is a block diagram illustrating an example UE configured according to aspects of the present disclosure.

FIG. 5 is a block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 500, a UE receives a first minimum processing time signal from a serving base station identifying a minimum processing time for the serving base station to process AUL transmissions. The UE, such as UE 115, may receive signaling via antennas 252a-r and wireless radios 800a-r identifying the minimum processing time from the serving base station. UE 115 stores the minimum processing time 801 in memory 282 to reserve for future reference. The signaling may include the AUL radio resource control (RRC) configuration, activation/deactivation downlink control information (DCI), the AUL-DFI itself, or even via system broadcast messages, when the minimum processing time is a cell-specific value.

At block 501, the UE receives a DFI message from the serving base station including acknowledgment information for a plurality of outstanding AUL transmissions. For example, UE 115 receives a DFI message from the serving base station via antennas 252a-r and wireless radios 800a-r and stores the acknowledgement information bitmap in memory 282 at DFI bitmap 802. The DFI message includes the bitmap that provides acknowledgement information on the outstanding AUL transmissions from UE 115.

At block 502, the UE identifies one or more acknowledged AUL transmissions having a pending time in excess of the minimum processing time and one or more pending AUL transmissions having the pending time within the minimum processing time. Under control of controller/ processor 280, UE 115 determines which of its outstanding AUL transmissions, maintained at AUL Tx buffer 803 in memory 282, are actually acknowledged in the DFI bitmap and which outstanding transmissions are assigned the default acknowledgement and, therefore, considered still pending. UE 115 uses minimum processing time 801 and identifies each of the outstanding AUL transmissions in AUL Tx buffer 803 meet or exceed minimum processing time 801 and which remain within minimum processing time 801. The acknowledgement information (e.g, ACK or NACK) associated with the outstanding AUL transmissions meeting or exceeding minimum processing time 801 are considered acknowledged (whether ACK or NACK), while the acknowledgement information associated with the outstanding AUL transmissions within the minimum processing time are considered pending—assigned to the default acknowledgement information.

Figure 6A:
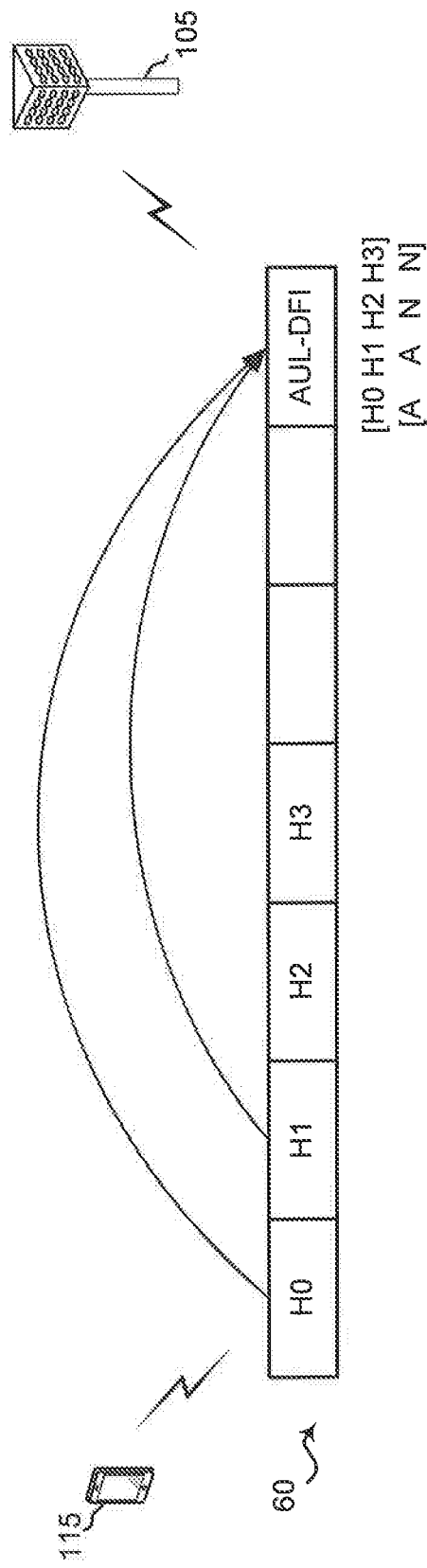
FIGS. 6A and 6B are block diagrams illustrating a UE and base station configured according to aspects of the present disclosure.
Figure 6B:
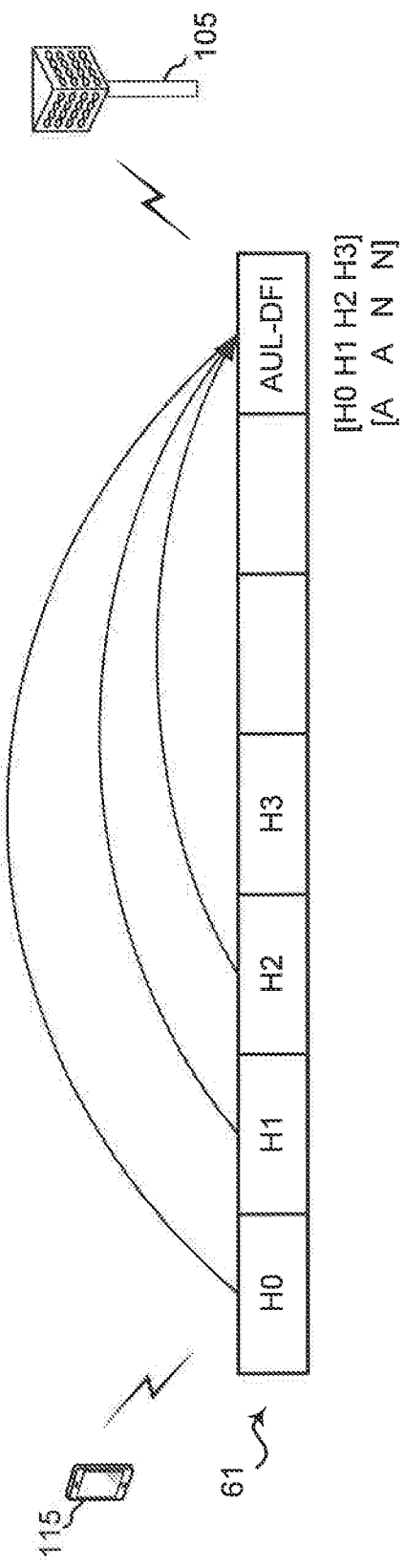

FIGS. 6A and 6B are block diagrams illustrating a UE 115 and base station 105 configured according to aspects of the present disclosure. In transmission streams 60 and 61, between UE 115 and base station 105, UE 115 makes AUL transmissions H0, H1, H2, and H3. UE 115 receives a AUL-DFI message from base station 105 as feedback to the AUL transmissions. The DFI bitmap within AUL-DFI message identifies [A[CK], A[CK], N[ACK], N[ACK]]. Once UE 115 receives the minimum processing time information from base station 105, UE 115 interprets the DFI bitmap corresponding to the signaled PUSCH-to-AUL-DFI timing relationship. In FIG. 6A, the minimum processing time indicated is 5 slots. Accordingly, each AUL transmission outstanding less than 5 slots (H2 & H3) will be considered still pending. Thus, the NACKs associated with AUL transmissions H2 and H3 are interpreted by UE 115 as default values, with H2 and H3 considered still pending. UE 115 will look for the true acknowledgement information for H2 and H3 in a next AUL-DFI message. AUL transmissions H0 and H1 are acknowledged with ACKs and marked by UE 115 as complete.

In FIG. 6B, the minimum processing time indicated is 4 slots. Accordingly, each AUL transmission outstanding less than 4 slots (H3) will be considered pending, while the other outstanding AUL transmissions (H0-H2) are considered acknowledged based on the associated acknowledgement information in the DFI bitmap. Thus, H0 and H1 are considered complete, while H2 is identified for retransmission because of the NACK acknowledgement information.

In addition, the UE should also know when to apply the any updated transmissions parameters in the AUL-DFI, so that both the UE and base station operate consistently. For example, modulation and coding scheme (MCS)/resource allocation (RA) (or delta MCS/RA), precoding matrix indicator (PMI), transmit power control (TPC), etc. could be included in addition to the downlink acknowledgement feedback. In LTE, it is reasonable for the UE to assume application of the n+4 processing timeline. In NR, however, different UEs may have different processing timeline (K2'). As indicated above, the AUL-DFI processing timeline may be indicated in the AUL RRC configuration, activation/deactivation DCI, AUL-DFI or the like. Based on the K1' and/or K2', the UE can determine the reference slot for the contention window (CW) update. The UE can use the first uplink slot in the latest uplink burst which satisfies K1' and K2' as the reference slot.

A UE may report its minimum processing time to its serving base station via a UE capability report. In NR, however, there is no AUL-DFI. The UE provides a capability report to the base station in which the minimum processing time is identified from uplink grant-to-uplink data transmission. That timing relationship is also applicable to the timing line between AUL-DFI-to-AUL data transmission parameters update.

Figure 7A:
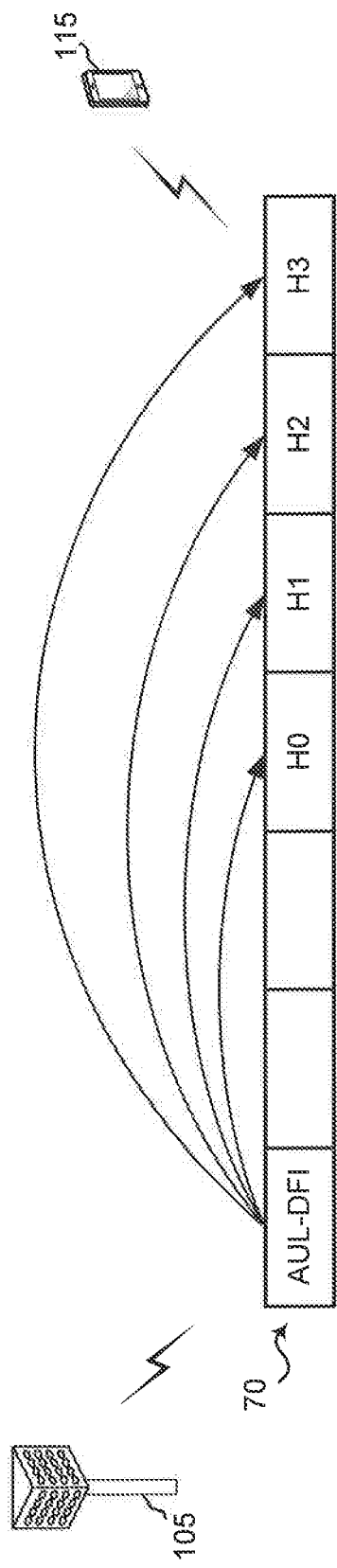
FIGS. 7A and 7B are block diagrams illustrating a UE and base station configured according to aspects of the present disclosure.
Figure 7B:
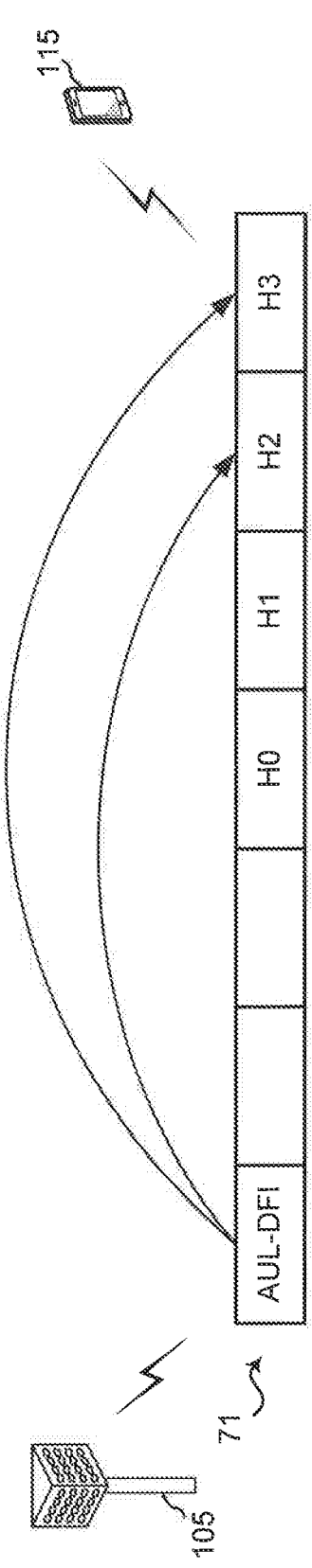

FIGS. 7A and 7B are block diagrams illustrating a UE 115 and base station 105 configured according to aspects of the present disclosure. UE 115 receives a AUL-DFI message from base station 105 in transmission streams 70 and 71 as feedback to the AUL transmissions. As noted above in FIG. 5, UE 115 may receive control signaling relevant to the AUL-DFI via several means (e.g., AUL RRC configuration messaging, activation/deactivation DCI, AUL-DFI message, and even system broadcast messages). In addition to receiving the minimum AUL-PUSCH-to-AUL-DFI processing time, UE 115 may also receive a minimum AUL-DFI-to-AUL-PUSCH processing time of UE 115. While the minimum AUL-PUSCH-to-AUL-DFI processing time informs UE 115 how to interpret the DFI signal for outstanding AUL transmissions, the minimum AUL-DFI-to-AUL-PUSCH processing time informs UE 115 when to implement changes to transmission parameters carried in updated parameters in the AUL-DFI. The AUL-DFI message may include updated transmission parameters, such as MCS/RA (or delta MCS/RA), PMI, TPC, and the like. UE 115 will implement these changes to the transmission parameters according to the minimum AUL-DFI-to-AUL-PUSCH processing time.

UE 115 receives AUL-DFI message from base station 105 in transmission streams 70 and 71. The AUL-DFI message includes one or more updated transmission parameters for UE 115. UE 115 makes AUL transmissions H0, H1, H2, and H3 in transmission streams 70 and 71. In FIG. 7A, the minimum timing relationship communicated to UE 115 is 3 slots. Accordingly, UE 115 will implement the updated transmission parameters to each of AUL transmissions H0-H3, as H0 occurs at n+3 from the AUL-DFI message.

In FIG. 7B, however, the minimum timing relationship communicated to UE 115 is 5 slots. As such, UE will transmit AUL transmissions H0 and H1 according to the existing transmission parameters, but transmit AUL transmissions H2 and H3 using the updated transmission parameters identified in the AUL-DFI. Thus, UE 115 applies the parameters updated in the AUL-DFI message corresponding to the signaled AUL-DFI-to-AUL PUSCH timing relationship.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a user equipment (UE) from a serving base station, a first signal identifying a minimum processing time for the serving base station to process physical uplink shared channel (PUSCH) transmissions from the UE;
   receiving, at the UE, a downlink feedback information (DFI) message from the serving base station, wherein the DFI message includes a bitmap containing acknowledgment information for a plurality of PUSCH transmissions from the UE; and
   identifying, by the UE, whether the plurality of PUSCH transmissions includes one or more acknowledged PUSCH transmissions having a pending time in excess of the minimum processing time and whether the plurality of PUSCH transmissions includes one or more pending PUSCH transmissions having the pending time less than the minimum processing time, by interpreting the bitmap using the minimum processing time identified by the first signal.

2. The method of claim 1, wherein the receiving the first signal identifying the minimum processing time includes receiving the first signal identifying the minimum processing time via one of:
   a semi-static autonomous uplink (AUL) configuration message;
   an activation/deactivation downlink control information (DCI) signal;
   the DFI message; or
   a system information broadcast signal from the serving base station.

3. The method of claim 1, further including:
   identifying, by the UE, uplink data for retransmission based on the acknowledgement information associated with the one or more acknowledged PUSCH transmissions; and monitoring, by the UE, a subsequent DFI message for the acknowledgement information associated with the one or more pending PUSCH transmissions.

4. The method of claim 1, wherein the DFI feedback message further includes updated transmission parameters for the UE.

5. The method of claim 4, wherein the updated transmission parameters include one or more of:
a modulation and coding scheme (MCS);
a resource allocation;
a delta change MCS;
a delta change resource allocation;
a precoding matrix indicator (PMI);
a transmit power control (TPC) message; and
a rank indicator.

6. The method of claim 4, further including:
receiving, by the UE, a second signal identifying an update time for the UE to apply the updated transmission parameters; and
updating, by the UE, transmission operations according to the updated transmission parameters, wherein the UE updates the transmission operations at the update time after the receiving the DFI with the updated transmission parameters.

7. The method of claim 6, further including:
identifying, by the UE, a reference slot for a contention window update according to a first available uplink slot satisfying one or both of: the minimum processing time, and the update time.

8. The method of claim 6, wherein the receiving the second signal includes receiving the second signal via one of:
a semi-static autonomous uplink (AUL) configuration message;
an activation/deactivation downlink control information (DCI) signal;
the DFI message; or
a system information broadcast signal from the serving base station.

9. The method of claim 6, wherein the first signal identifying the minimum processing time includes the second signal.

10. The method of claim 1, wherein the minimum processing time for the base station to process PUSCH transmissions comprises a minimum processing time for the base station to process autonomous uplink (AUL) transmissions, and wherein the plurality of PUSCH transmissions comprises a plurality of AUL transmissions.

11. An apparatus configured for wireless communication, comprising:
means for receiving, at a user equipment (UE) from a serving base station, a first signal identifying a minimum processing time for the serving base station to process physical uplink shared channel (PUSCH) transmissions from the UE;
means for receiving, at the UE, a downlink feedback information (DFI) message from the serving base station, wherein the DFI message includes a bitmap containing acknowledgment information for a plurality of PUSCH transmissions from the UE; and
means for identifying, by the UE, whether the plurality of PUSCH transmissions includes one or more acknowledged PUSCH transmissions having a pending time in excess of the minimum processing time and whether the plurality of PUSCH transmissions includes one or more pending PUSCH transmissions having the pending time less than the minimum processing time, by interpreting the bitmap using the minimum processing time identified by the first signal.

12. The apparatus of claim 11, wherein the means for receiving the first signal identifying the minimum processing time includes means for receiving the first signal identifying the minimum processing time via one of:
a semi-static autonomous uplink (AUL) configuration message;
an activation/deactivation downlink control information (DCI) signal;
the DFI message; or
a system information broadcast signal from the serving base station.

13. The apparatus of claim 11, further including:
means for identifying, by the UE, uplink data for retransmission based on the acknowledgement information associated with the one or more acknowledged PUSCH transmissions; and
means for monitoring, by the UE, a subsequent DFI message for the acknowledgement information associated with the one or more pending PUSCH transmissions.

14. The apparatus of claim 11, wherein the DFI feedback message further includes updated transmission parameters for the UE.

15. The apparatus of claim 14, wherein the updated transmission parameters include one or more of:
a modulation and coding scheme (MCS);
a resource allocation;
a delta change MCS;
a delta change resource allocation;
a precoding matrix indicator (PMI);
a transmit power control (TPC) message; and
a rank indicator.

16. The apparatus of claim 11, wherein the minimum processing time for the base station to process PUSCH transmissions comprises a minimum processing time for the base station to process autonomous uplink (AUL) transmissions, and wherein the plurality of PUSCH transmissions comprises a plurality of AUL transmissions.

17. A non-transitory computer-readable medium having program code recorded thereon, the program code comprising:
program code executable by a computer for causing the computer to receive, at a user equipment (UE) from a serving base station, a first signal identifying a minimum processing time for the serving base station to process physical uplink shared channel (PUSCH) transmissions from the UE;
program code executable by the computer for causing the computer to receive, at the UE, a downlink feedback information (DFI) message from the serving base station, wherein the DFI message includes a bitmap containing acknowledgment information for a plurality of PUSCH transmissions from the UE; and
program code executable by the computer for causing the computer to identify, by the UE, whether the plurality of PUSCH transmissions includes one or more acknowledged PUSCH transmissions having a pending time in excess of the minimum processing time and one or more pending PUSCH transmissions having the pending time less than the minimum processing time, by interpreting the bitmap using the minimum processing time identified by the first signal.

18. The non-transitory computer-readable medium of claim 17, further including:
   program code executable by the computer for causing the computer to identify, by the UE, uplink data for retransmission based on the acknowledgement information associated with the one or more acknowledged PUSCH transmissions; and
   program code executable by the computer for causing the computer to monitor, by the UE, a subsequent DFI message for the acknowledgement information associated with the one or more pending PUSCH transmissions.

19. The non-transitory computer-readable medium of claim 17, further including:
   program code executable by the computer for causing the computer to receive, by the UE, a second signal identifying an update time for the UE to apply the updated transmission parameters; and
   program code executable by the computer for causing the computer to update, by the UE, transmission operations according to the updated transmission parameters, wherein the UE updates the transmission operations at the update time after the program code executable by the computer for causing the computer to receive the DFI with the updated transmission parameters, and
   wherein the DFI feedback message further includes updated transmission parameters for the UE.

20. The non-transitory computer-readable medium of claim 19, further including:
   program code executable by the computer for causing the computer to identify, by the UE, a reference slot for a contention window update according to a first available uplink slot satisfying one or both of: the minimum processing time, and the update time.

21. The non-transitory computer-readable medium of claim 19, wherein the first signal identifying the minimum processing time includes the second signal.

22. The non-transitory computer-readable medium of claim 17, wherein the minimum processing time for the base station to process PUSCH transmissions comprises a minimum processing time for the base station to process autonomous uplink (AUL) transmissions, and wherein the plurality of PUSCH transmissions comprises a plurality of AUL transmissions.

23. An apparatus configured for wireless communication, the apparatus comprising:
   at least one processor; and
   a memory coupled to the at least one processor,
   wherein the at least one processor is configured:
      to receive, at a user equipment (UE) from a serving base station, a first signal identifying a minimum processing time for the serving base station to process physical uplink shared channel (PUSCH) transmissions from the UE;
      to receive, at the UE, a downlink feedback information (DFI) message from the serving base station, wherein the DFI message includes a bitmap containing acknowledgment information for a plurality of PUSCH transmissions from the UE; and
      to identify, by the UE, whether the plurality of PUSCH transmissions includes one or more acknowledged PUSCH transmissions having a pending time in excess of the minimum processing time and whether the plurality of PUSCH transmissions includes one or more pending PUSCH transmissions having the pending time less than the minimum processing time, by interpreting the bitmap using the minimum processing time identified by the first signal.

24. The apparatus of claim 23, wherein the configuration of the at least one processor to receive the first signal identifying the minimum processing time includes configuration to receive the first signal identifying the minimum processing time via one of:
   a semi-static autonomous uplink (AUL) configuration message;
   an activation/deactivation downlink control information (DCI) signal;
   the DFI message; or
   a system information broadcast signal from the serving base station.

25. The apparatus of claim 23, further including configuration of the at least one processor:
   to identify, by the UE, uplink data for retransmission based on the acknowledgement information associated with the one or more acknowledged PUSCH transmissions; and
   to monitor, by the UE, a subsequent DFI message for the acknowledgement information associated with the one or more pending PUSCH transmissions.

26. The apparatus of claim 24, further including configuration of the at least one processor:
   to receive, by the UE, a second signal identifying an update time for the UE to apply the updated transmission parameters; and
   to update, by the UE, transmission operations according to the updated transmission parameters, wherein the UE updates the transmission operations at the update time after the configuration of the at least one processor to receive the DFI with the updated transmission parameters, and
   wherein the DFI feedback message further includes updated transmission parameters for the UE.

27. The apparatus of claim 26, further including configuration of the at least one processor to identify, by the UE, a reference slot for a contention window update according to a first available uplink slot satisfying one or both of: the minimum processing time, and the update time.

28. The apparatus of claim 26, wherein the configuration of the at least one processor to receive the second signal includes configuration of the at least one processor to receive the second signal via one of:
   a semi-static autonomous uplink (AUL) configuration message;
   an activation/deactivation downlink control information (DCI) signal;
   the DFI message; or
   a system information broadcast signal from the serving base station.

29. The apparatus of claim 26, wherein the first signal identifying the minimum processing time includes the second signal.

30. The apparatus of claim 24, wherein the minimum processing time for the base station to process PUSCH transmissions comprises a minimum processing time for the base station to process autonomous uplink (AUL) transmissions, and wherein the plurality of PUSCH transmissions comprises a plurality of AUL transmissions.

\* \* \* \* \*